United States Patent [19]

Jalbing

[11] 4,238,456

[45] Dec. 9, 1980

[54] CATALYTIC CONVERTER WITH UNIFORM AIR DISTRIBUTION AND MIXING WITH THE EXHAUST GASES

[75] Inventor: John I. Jalbing, Millington, Mich.

[73] Assignee: General Motors Corporation, Detroit, Mich.

[21] Appl. No.: 30,124

[22] Filed: Apr. 16, 1979

[51] Int. Cl.³ .................... B01J 8/02; F01N 3/28; F01N 3/30
[52] U.S. Cl. ............................ 422/172; 60/299; 60/307; 422/176; 422/180
[58] Field of Search ............... 422/171, 172, 176, 177, 422/179, 180; 60/299, 307; 423/213.2, 213.7

[56] References Cited

U.S. PATENT DOCUMENTS

| | | | |
|---|---|---|---|
| 3,729,936 | 5/1973 | De Palma et al. | 422/172 |
| 3,740,197 | 6/1973 | Scheitlin et al. | 422/176 |
| 3,771,969 | 11/1973 | Scheitlin | 422/172 |
| 3,823,555 | 7/1974 | Cole | 422/177 |
| 3,902,853 | 9/1975 | Marsee | 422/176 |
| 3,929,419 | 12/1975 | Chapman | 422/172 |
| 4,049,388 | 9/1977 | Scheitlin et al. | 422/172 |

Primary Examiner—Bradley R. Garris
Attorney, Agent, or Firm—R. L. Phillips

[57] ABSTRACT

In a catalytic converter, a short closed-end air tube which extends across the path of the exhaust gases ahead of an oxidizing catalyst is provided with three linear circumferentially-spaced rows of holes with the holes in one of the rows facing upstream into the exhaust gases while the holes in the other two rows face in opposite directions transverse to the exhaust gas flow. The holes in each of the rows are equally spaced along the length of the tube and decrease in size toward the closed end so as to deliver substantially equal amounts of air. In addition, the holes in the three rows are sized in relation to each other so that the two rows of transversely directed holes deliver substantially equal and cooperatively greater amounts of air than the row of holes facing into the exhaust gases.

3 Claims, 8 Drawing Figures

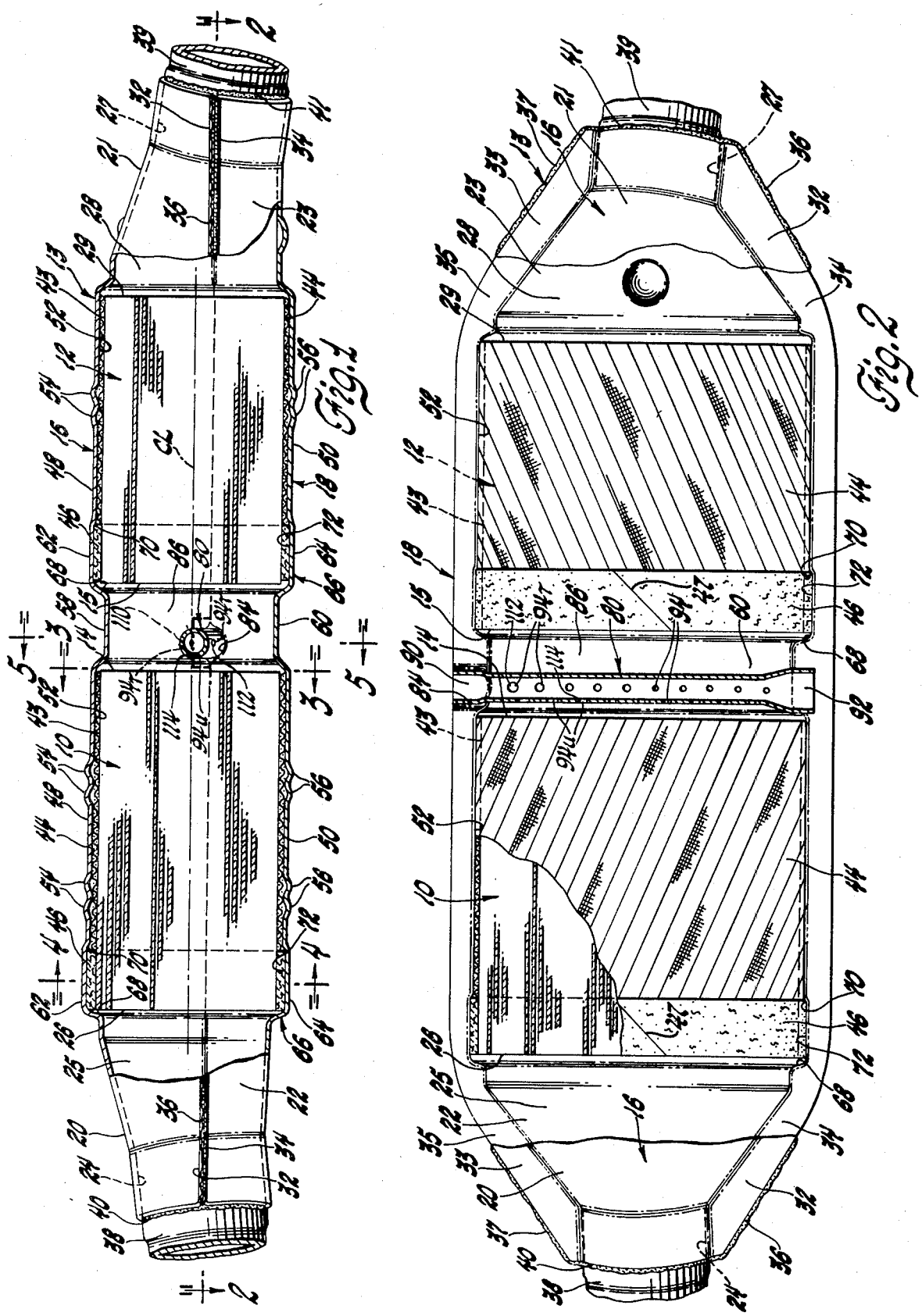

U.S. Patent  Dec. 9, 1980  Sheet 2 of 3  4,238,456
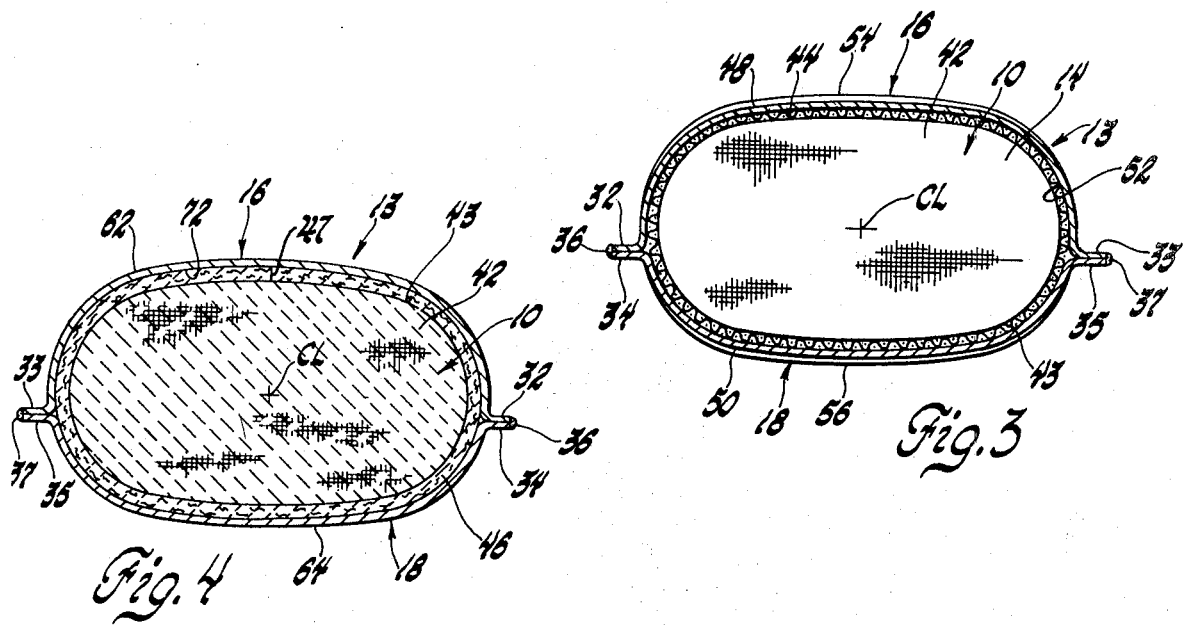
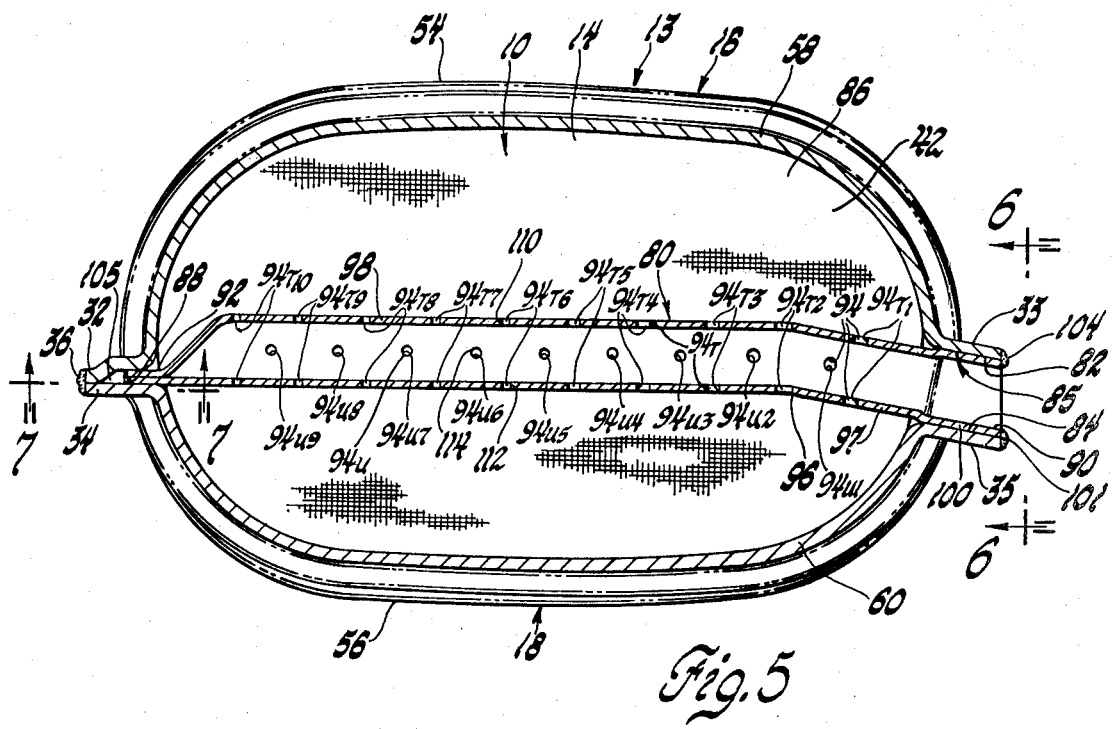

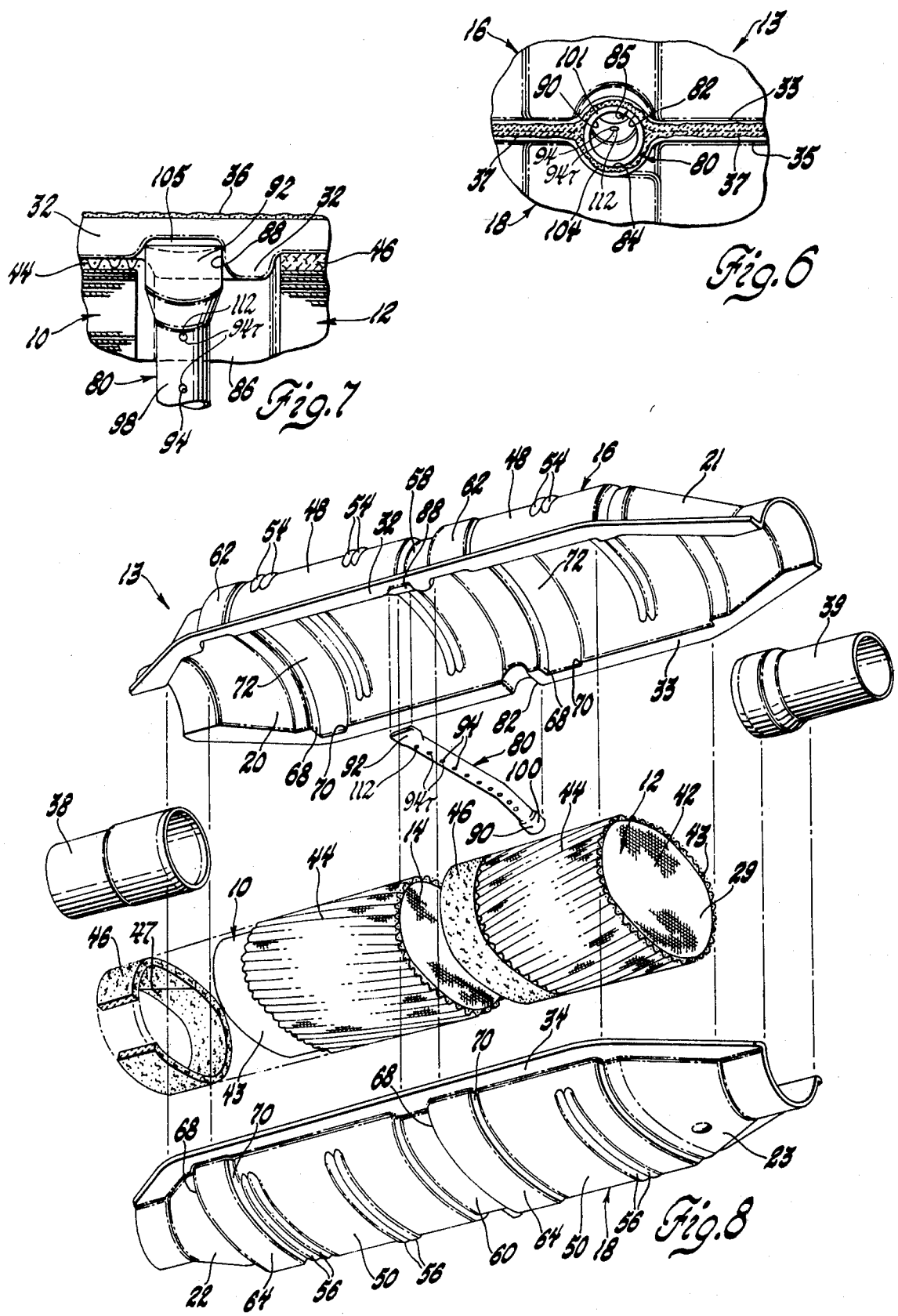

CATALYTIC CONVERTER WITH UNIFORM AIR DISTRIBUTION AND MIXING WITH THE EXHAUST GASES

This invention relates to catalytic converters for internal combustion engine exhaust gases and more particularly to such converters of the type having air injected into the exhaust gases for oxidation induced by an oxidizing catalyst.

In catalytic converters of the above type, it is known that air may be injected by a straight or substantially straight air tube that extends through the path of the exhaust gases. For such air injection, holes are typically provided in the air tube with the holes spaced along the length thereof and also thereabout in an attempt to provide uniform distribution and mixing of the air with the passing exhaust gases prior to reaching the oxidizing catalyst. However, in such arrangements wherein the tube is short and of uniform cross-section and has a closed end, it has been found that the air pressure within the tube may not be evenly distributed therealong and instead increases along the length thereof toward the closed end. In that case and if the air injection holes are of the same size, those that are spaced along the length of the tube will then deliver various amounts of air resulting in non-uniform air distribution and mixing with the exhaust gases thereby decreasing the efficiency of oxidation induced by the catalyst. Furthermore, it has been found that the direction which the air injection holes face relative to the exhaust gases also has a substantial effect on the air distribution and mixing efficiency and resultantly the efficiency of oxidation induced by the catalyst.

The present invention solves both such distribution and mixing problems by (a) effecting delivery of air in substantially equal amounts at points that are equally spaced along the length of the tube and in directions facing transverse to the exhaust gases passing on opposite sides of the tube, (b) also effecting delivery of air in substantially equal amounts at points that are equally spaced along the length of the tube but in a direction facing upstream toward the oncoming exhaust gases and, (c) proportioning such air delivery so that the total amount delivered in the upstream direction is substantially less than that delivered in the transverse directions. It is believed that the improved oxidation that has been found to result from such delivery and proportioning is produced by the early but limited uniform distribution of air into the intermediate layer of exhaust gases passing immediately by the air tube with the greater proportion of uniformly distributed air that is delivered transversely and slightly later effecting air distribution and mixing completely across the outer layers of the exhaust gases passing on opposite sides of the air tube which coupled with continued mixing thereby of the earlier introduced air finally totally homogenizes all the air with the exhaust gases.

In the preferred embodiment of the invention, there is provided three linear circumferentially-spaced rows of holes with the holes in each row equally axially spaced along the length of the tube and decreasing in size toward the closed tube end. Two of the rows are diametrically opposite each other and face transverse to the passing exhaust gases on opposite sides of the tube while the third row faces directly into the oncoming exhaust gases. The transversely facing holes are sized in relation to each other and to the different air pressure at their various axial locations so as to deliver substantially equal amounts of air. The upstream facing holes are in a similar manner sized to deliver air in substantially equal amounts relative to each other but are proportionately smaller than the transversely facing holes so as to deliver lesser amounts of air. In the preferred embodiment, substantially complete homogeneous mix of air and exhaust gases is obtained with the transversely facing holes delivering 80-90% of the air and the upstream facing holes delivering the remaining 10-20%.

These and other objects, advantages and features of the present invention will become more apparent from the following description and drawings in which:

FIG. 1 is a side elevational view with parts broken away of a catalytic converter embodying the present invention.

FIG. 2 is a view taken along the line 2—2 in FIG. 1.

FIG. 3 is a cross-sectional view taken along the line 3—3 in FIG. 1.

FIG. 4 is a cross-sectional view taken along the line 4—4 in FIG. 1.

FIG. 5 is an enlarged cross-sectional view taken along the line 5—5 in FIG. 1.

FIG. 6 is a fragmentary view taken along the line 6—6 in FIG. 5.

FIG. 7 is a fragmentary view taken along the line 7—7 in FIG. 5.

FIG. 8 is an exploded view of the converter in FIG. 1.

Referring to the drawings, there is shown a catalytic converter embodying the present invention for use in a vehicle to purify the exhaust gases from an internal combustion engine. The converter generally comprises a pair of monoliths 10 and 12 which are mounted end-to-end in a sheet metal housing 13 of the clamshell type with their respective inner ends 14 and 15 facing each other. The housing 13 consists of a pair of shell members 16 and 18 which cooperatively enclose the peripheral sides of the monoliths and in addition, have integrally formed funnel portions 20, 21 and 22, 23 respectively, at opposite ends thereof. The respective funnel portions 20 and 22 of the shell members 16 and 18 cooperatively form a circular cylindrical opening 24 in one end of the housing and also an internal passage 25 which diverges outwardly therefrom to expose this opening to the entire outer end 26 of monolith 10. The other funnel portions 21 and 23 cooperatively form a circular cylindrical opening 27 in the other end of the housing and also an internal passage 28 which diverges outwardly therefrom to expose this opening to the entire outer end 29 of the other monolith 12. In addition, the respective shell members 16 and 18 have co-planar flanges 32, 33 and 34, 35 which extend along opposite sides and between the ends thereof. The respective flanges 32, 33 mate with the flanges 34, 35 and are permanently sealingly welded together by separate welds 36 and 37 along the edges thereof.

Furthermore, for aligning the converter in an underfloor vehicle installation in the exhaust system, it will be observed that the housing openings 24 and 27 are slightly angled downward as viewed in FIG. 1 with the opening 27 further slightly angled sideways as viewed in FIG. 2. Also, the longitudinal split line or plane of the converter housing at its flanges is offset downward from its centerline CL as viewed in FIGS. 1, 3 and 4. This offset is such that the lower shell member 18 is shallow as compared with the upper shell member 16 and that coupled with the downward angling of the openings results in the bottom point of both the housing openings being slightly offset upward from the bottom-most point of the converter while the top point of these openings are offset a substantial distance downward from the top-most point of the converter. The housing's cylindrical openings 24 and 27 receive a connector pipe 38 and 39 respectively, and these pipes are sealingly fixed about their periphery to the edge of the respective housing openings by continuous separate welds 40 and 41 and are adapted to connect the converter in the engine's exhaust system so that the exhaust gases enter to the monolith 10 and exit from the other monolith 12.

The monoliths 10 and 12 are constructed of a frangible material such as ceramic and are extruded with an identical honeycomb cross-section 42 and an oval cylindrical periphery 43 as shown in FIG. 3, such oval shape providing for a low converter profile as compared to width for underfloor vehicle installation where accommodating space height is very limited. The monoliths 10 and 12 are coated with a suitable 3-way reduction, or oxidation catalyst for purifying the exhaust gases entering through the opening 24 serving as the housing inlet and prior to exiting the opening 27 serving as the housing outlet by reduction and oxidation processes as is well-known in the art.

The housing 13 consisting of the shell members 16 and 18 is preferably constructed of stainless steel sheet or some other high temperature non-corrosive metal sheet and thus has a substantially higher rate of thermal expansion than that of the ceramic monoliths 10 and 12. As a result, the housing expands away from the monoliths as the converter heats up and some provision must be made for both supporting and sealing the monoliths to prevent fracture thereof and bypassing or internal leakage of the exhaust gases past their interior.

In the converter shown, each of the monoliths 10 and 12 is separately supported by both a cylindrical wire mesh sleeve 44 woven from stainless steel wire and a cylindrical sleeve 46 of resilient heat expandable intumescent material such as that known by the tradename Interam and made by Technical Ceramics Products Division, 3M Company. The wire mesh sleeve 44 and intumescent sleeve 46 cooperatively encompass the entire cylindrical surface 43 of the respective monoliths with the axial length of the intumescent sleeve being substantially less than that of the wire mesh sleeve. For example, in the converter shown, the axial length of the intumescent sleeve is about one-sixth that of the wire mesh sleeve for the monolith 10 while this fraction is increased slightly to one-fifth for the monolith 12 because of the preference to use the same axial width intumescent sleeve with the monolith 12 which is made axially shorter than the monolith 10 to provide adequate space for the air tube installation described later. Furthermore, for convenience of manufacture both the wire mesh sleeve and the intumescent sleeve are made from sheet stock and are thus split with the former split longitudinally and the latter split diagonally along a straight line 47.

To then make full use of these different type monolith supports, the respective housing shell members 16 and 18 are formed with intermediate partial-cylindrical portions 48 and 50 which are partial-oval in cross-section as viewed in FIG. 3 and cooperatively provide on their interior side an oval-cylindrical surface 52 which corresponds to and is spaced radially outward from the surface 43 of the respective monoliths so as to define a cylindrical space therebetween in which the wire mesh sleeve 44 is compressively mounted separate from its adjacent intumescent sleeve. For increased housing stiffness to resist bulging out in this area on converter heat up, the respective housing portions 48 and 50 have integrally formed pairs of axially spaced, laterally extending ribs 54 and 56. And for increased housing stiffness between the two monoliths, the respective shell members 16 and 18 are further formed with partial-annular rib portions 58 and 60 which extend slightly radially inward of the edges of the inner ends 14 and 15 of the monoliths.

The wire mesh sleeve 44 prior to assembly has a radial thickness substantially larger than the radial width of the wire mesh accommodating space so that when the wire mesh sleeve is first mounted about its respective monolith as shown in FIG. 5 and this subassembly is then clamped between the shell members 16 and 18, the wire mesh will be compressed a certain amount. This spring compression is determined so that the monolith is resiliently radially supported and restrained against relative axial movement in the housing by the wire mesh sleeve at atmospheric temperature conditions and then when the converter is heated up during use in the vehicle and as the housing expands radially away from the monolith, the wire mesh expands therewith to retain such resilient radial support and axial location of the monolith within the housing. For example, in an actual construction of the converter shown and with the converter housing at atmospheric temperature this effect was provided when the housing had an average radial growth with heat of about 0.020 inches by a radial spacing between the monolith and the housing of about 0.090 inches and compression of the wire mesh sleeve within this space from a preassembly radial thickness of about 0.250 inches.

On the other hand, the intumescent sleeve 46 which has a rectangular cross-section as seen in FIG. 1 is intended to swell on first converter heat up to provide tight sealing but has less resiliency and compliance than the wire mesh sleeve 44 for support of the monolith. Its manner of mounting including the housing sizing therefor is substantially different from that of the wire mesh sleeve previously described so that it is effective to provide both tight sealing between the housing and monolith while also assisting the wire mesh sleeve in radially supporting and axially retaining the monolith as the housing expands with heat. This is accomplished by forming radially outwardly projecting partial-cylindrical portions 62 and 64 integral with the respective shell members 16 and 18. These housing portions 62 and 64 have a partial-oval cross-section as seen in FIG. 4 and cooperatively provide a radially ribbed cylindrical portion 66 integral with the housing extending about the cylindrical surface 43 of the respective monoliths adjacent their inlet end and adjoining the cylindrical housing portion 48, 50 extending about the wire mesh sleeve. The two radial rib portions 68 and 70 of the cylindrical portion 66 radially stiffen the housing at the inlet end of the respective monoliths and also partially axially confine an interior cylindrical surface 72 on the interior side of the cylindrical portion 66 which corresponds to and is spaced radially outward from the surface 43 of the respective monoliths. The interior cylindrical housing surface 72 cooperates with the cylindrical surface 43 of the monolith to provide a radially confined annular seal accommodating space therebetween having partial axial confinement at the housing as provided by the radial rib portions 68 and 70.

The seal accommodating space differs from the wire mesh sleeve accommodating space in having a radial width dimension prior to converter heat up that is substantially larger than that of the space for the wire mesh sleeve but is only slightly smaller than the radial thickness of the intumescent sleeve 46. For example, in the previously described actual construction of the converter shown, the seal accommodating space was then provided with a radial width dimension of about 0.130 inches as compared to the 0.090 inches space for the wire mesh and the radial thickness of the intumescent sleeve 46 as will now be discussed. The intumescent sleeve 46 which has an expansion rate substantially greater than that of the housing is determined to have a preassembly radial thickness substantially smaller than that of the wire mesh sleeve but only slightly larger by a predetermined amount than the radial width dimension of the seal accommodating space so as to prevent fracturing of the monolith at assembly while allowing sufficient bulk density of this material in the seal accommodating space for subsequent support and sealing of the monolith as the converter housing expands with heat. For example, in the previously described actual construction of the converter shown, the intumescent sleeve 46 was then provided with a preassembly radially thickness of about 0.185 inches which could freely radially expand with heat to about 0.500 inches if not constrained as compared to the 0.130 inches space in which it is to be clamped and the average radial housing growth of 0.020 inches that occurs with heat.

The intumescent sleeve 46 is subassembled on each of the monoliths like the wire mesh sleeve 44 as shown in FIG. 5 and together therewith is received between the shell members 16 and 18. However, because of the difference in the preassembly radial thickness of the wire mesh sleeve 44 and the intumescent sleeve 46 at each of the monoliths as described above, the latter is only tightly received rather than substantially compressed between the housing and the monolith during assembly of the converter. As a result, the intumescent sleeve 46 at each of the monoliths is thereby prevented from transmitting clamping forces from the shell members large enough to fracture the monolith while the wire mesh sleeve is being compressed its required amount on bringing together of the shell member's flanges. With the converter thus assembled and then on its first heat up in the vehicle, the intumescent sleeve 46 at each of the monoliths swells and is resisted by the stiffened housing portion 66 and is thereby caused to exert substantial restraining pressure between the stiffened housing and the monolith without fracturing the monolith and without causing bulging of the heated housing because of such increased radial stiffening of the latter. Thereafter, the intumescent sleeve 46 remains effective to provide tight sealing between the housing and the monolith at the inlet end thereof while also remaining sufficiently resilient to assist the adjacent wire mesh sleeve 44 in providing resilient radial support of the monolith and also relative axial location thereof as the housing expands with heat.

Air injection in the case where the monolith 12 has the oxidation catalyst is accomplished by the addition of a simple air tube 80 of circular cross-section mounted between the flanges of the shell members 16 and 18 and extending between two monoliths 10 and 12 as shown in FIGS. 1, 2 and 5-8. For such mounting there is formed a semi-circular recess 82 and 84 in the interior side of the respective shell member flanges 33 and 35 on one side of the housing. The recesses 82 and 84 extend across these flanges and cooperatively define a circular opening 85 therebetween as best shown in FIGS. 5 and 6 which opens to the space 86 within the housing between the outlet end 14 of monolith 10 and the inlet end 15 monolith 12. Then opposite the opening 85, there is formed a tube receiving recess 88 in the interior side of only the upper shell member flange 32 on the opposite side of the housing as best seen in FIGS. 5 and 7. The recess 88 is formed with three sides and a flat bottom and is located inward of where the upper and lower shell member flanges 32 and 34 are joined by the weld 36 and is inwardly open to the housing space 86.

The air tube 80 is, like the housing, made of stainless steel or some other high-temperature non-corrosive metal and has an open end 90 mounted in the thus formed housing opening 85. The air tube 80 extends across the space 86 within the housing between the two monoliths 10 and 12 and has its opposite end 92 both closed and received in the recess 88 as described in more detail later. Furthermore, the air tube 80 has a plurality of holes 94 spaced thereabout and therealong for injecting air into the passing exhaust gases. For even distribution of this air in the up and down direction as viewed in FIG. 5, both the air tube and the housing opening therefor are made to accommodate for the downward offset split line of the shell members at their flanges so that the air tube extends horizontally across the housing space 86 mid-height and thus centrally thereof. This is accomplished by the housing opening 85 being formed with a slight downward angle to horizontal to accommodate angled entry of the tube in an upward direction away from the flanges on the opposite side. Then within the housing, the air tube 80 has a slight bend 96 joining its angled straight entry portion 97 with a straight horizontal portion 98 which extends horizontally across the space 86 and through the housing centerline CL at right angles thereto.

The inlet end of the tube has an enlarged diameter portion 100 which closely fits in the housing opening 85 and is adapted to receive an air delivery pipe, not shown, delivering the air for the enhanced oxidation. The edge 101 of the open end 90 of the air tube aligns with the edges of the shell member flanges 33 and 35 forming the opening 85 thereabout and these edges and thus the air tube are permanently sealingly fixed by a continuous weld 104 therebetween external of the housing.

On the other hand, the opposite end 92 of the air tube is neither permanently fixed to the housing nor open. Instead, the tube end 92 is closed by flattening thereof into a rectangular profile which is tightly but slidably received with substantial end clearance 105 in the pocket means formed internal of the weld 36 by the recess 88 in the interior side of the upper housing shell member flange 32 cooperating with the opposite facing interior side of the lower shell member flange 34 on this side of the housing. Furthermore, it will be observed that the flattened end 92 is offset downward from the center-line of the horizontal tube portion 98 to support the elevation of the latter in compensating for the offset split line of the housing at its flanges.

Thus, the air tube 80 is permanently and sealingly fixed at its open end 90 to one side of the housing between two of its flanges by external welding and thus without requiring a hole through one of the shell members where the wall would be relatively weak. On the other hand, the tube's closed end 92 is slidably supported between the two flanges on the opposite side of the housing interior of their weld and thus without interrupting their sealed integrity while taking advantage of their stiff support so as to not to require either an additional support on one of the shell members or an additional joint in the housing that must be sealed. As a result, the air tube is free to expand with heat along its length in the end clearance 105 of the recess 88 and relative to the housing while remaining firmly supported thereby at its opposite ends. Alternatively, that side of the housing slidably supporting the closed end of the air tube is free to expand with heat relative thereto while the opposite housing side in expanding with heat carries the tube which is fixed thereto along therewith. Furthermore, this air injection arrangement is easy to assemble along with the monoliths as is seen in FIG. 8 by simply arranging the air tube between the shell member flanges prior their mating and welding. In addition, by assembling the converter upside down, the closed end 92 of the air tube may then be layed in and thus located by the pocket recess 88 therefor in the upper shell member flange 32 prior to bringing the two shell members together.

The catalytic converter structure thus far described is like that disclosed in co-pending U.S. patent application Ser. No. 30,125, filed Apr. 16, 1979 entitled Catalytic Converter With Air Tube and assigned to the assignee of this invention. In such a converter having a short closed-end air tube, it has been found that the size and location of the tube's air injection holes are primary determining factors, apart from the central location of the tube in the exhaust gas flow, in establishing uniform distribution and mixing of the air with the exhaust gases for best oxidation.

According to the present invention and in the preferred embodiment thereof as shown in FIGS. 1, 2 and 5-8, the air injection holes 94 are arranged in three (3) linear rows 110, 112 and 114 which are circumferentially spaced about and extend linearly along the tube 80. The holes in rows 110 and 112 and designated as $94_T$ are equally axially spaced and located diametrically opposite each other and face at right angles and thus transverse to the exhaust gases passing on opposite sides of the tube. On the other hand, the holes in the remaining row 114 and designated as $94_U$ directly face toward the exhaust gases exiting from the monolith 10 and are located centrally of the axial locations of the holes $94_T$ in the other two rows 110 and 112.

In such a substantially straight short air tube 80 as well as a straight short air tube, the air delivered thereto follows the easiest path and rather than turning to flow out through the holes wants to rush toward the closed end 92. As a result, the pressure in the tube increases in the direction of the closed end 92. To then provide even distribution of the air issuing from the holes in each of the rows 110, 112 and 114, the holes in each row are sized in relation to the others in the row and to the actual air pressure at their various axial location so as to deliver substantially equal amounts of air. This sizing is determinable by trial and error and/or the well known laws of fluid dynamics and requires that the holes in each of the rows have a decreasing size in the direction of the air pressure increase in the tube, i.e. toward the closed end, with the holes in each row either progressively decreasing in size or having several groupings of equal size holes with the hole sizes of the groups progressively decreasing. This hole sizing while improving distribution still was found lacking in producing complete or substantially complete homogeneous mixing of the total air delivery with the exhaust gases. However, it was found that substantially complete mixing is obtained when the upstream facing holes $94_U$ and the transversely facing holes $94_T$ are then further sized in relation to each other so that the former deliver only a certain small percentage of the total air flow with this sizing knowing the proportion desire again determinable by trial and error and/or the well known laws of fluid dynamics.

For example, in an actual construction of the preferred embodiment shown, most efficient or substantially complete mixing was found to occur with an air flow to the tube of 6.5–10 cfm by sizing the holes so that 10–20% of the total amount of air is injected in substantially uniform amounts by the upstream facing holes $94_U$ while the remaining 80–90% is injected in substantially uniform amounts by the transversely facing holes $94_T$. In this actual construction, there was provided ten (10) holes $94_{T1\text{-}10}$ in each row 110 and 112 and nine (9) holes $94_{U1\text{-}9}$ in row 114 as indicated in FIG. 5. Peak efficiency was found to occur mid-range at 15% air delivery by the upstream facing holes $94_U$ and the remaining 85% by the transversely facing holes $94_T$ and this was produced with the following hole sizes wherein groupings of holes of equal size in each row was used:

| HOLE | HOLE NUMBER | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| | HOLE DIAMETER (MILLIMETERS) | | | | | | | | | |
| $94_T$ | 3.20 | 3.20 | 2.50 | 2.50 | 2.50 | 2.25 | 2.25 | 2.25 | 2.25 | 2.25 |
| $94_U$ | 2.25 | 2.25 | 1.50 | 1.50 | 1.50 | 1.50 | 1.50 | 1.50 | 1.50 | |

To illustrate the individual hole flow rates producing the 15%:85% air delivery or injection apportioning in the respective upstream and transverse directions, at an air flow of 8 cfm into the air tube each of the transversely facing holes $94_{T1\text{-}10}$ is delivering about 0.35 cfm while each of the upstream facing holes $94_{U1\text{-}9}$ is delivering about 0.12 cfm. Furthermore, in the preferred embodiment it was found that for such mixing to be completed before exposure to the downstream oxidizing catalyst means 12 it was necessary to locate the air tube 80 a certain minimum distance therefrom. This distance was determined to be about 0.75 inches and because of the limited space between the two catalyst means 10 and 12 necessitated that the air tube be located closer to the catalyst means 10 as shown.

It will also be appreciated that there are certain advantageous manufacturing features in the preferred embodiment. For example, the two rows of transversely facing holes are diametrically opposite each other and thus can be simultaneously formed. In addition, it is seen that the holes in each row can be arranged in two or more groups of equal hole size which further simplifies their manufacture in requiring less tooling.

It will also be appreciated that modifications are in the spirit and scope of the invention. Thus, the above described preferred embodiment is intended to be illustrative of the invention which may be modified within the scope of the appended claims.

The embodiments of the invention in which an exclusive property or privilege is claimed are defined as follows:

1. In a catalytic converter for internal combustion engine exhaust gases and of the type having oxidizing catalyst means mounted in a housing wherein a straight or substantially straight air tube with a closed end extends into the housing for injecting air into the exhaust gases for oxidation thereof: the improvement comprising in combination, a plurality of circumferentially spaced sets of holes in the air tube, one set of said holes facing upstream into the exhaust gases, two other sets of said holes facing in opposite directions transverse to the exhaust gas flow, the holes in each of said three sets being spaced along the length of tube and decreasing in size toward the closed end so as to deliver substantially equal amounts of air, and the holes in all said three sets being sized in relation to each other so that the two sets of transversely facing holes deliver substantially equal and separately greater amounts of air than the upstream facing holes.

2. In a catalytic converter for internal combustion engine exhaust gases and of the type having oxidizing catalyst means mounted in a housing wherein a straight or substantially straight air tube with a closed end extends into the housing for injecting air into the exhaust gases for oxidation thereof: the improvement comprising in combination, three circumferentially-spaced rows of holes in the air tube, the holes in one of said rows facing upstream into the exhaust gases, the holes in the other two rows facing in opposite directions transverse to the exhaust gas flow, the holes in each of said rows being substantially equally spaced along the length of the air tube and decreasing in size toward the closed end so as to deliver substantially equal amounts of air, and the holes in all said three rows being sized in relation to each other so that the two rows of transversely facing holes deliver substantially equal amounts of air and cooperatively 80–90% of the total air while the one row of upstream facing holes delivers the remaining 10–20%.

3. In a catalytic converter for internal combustion engine exhaust gases and of the type having oxidizing catalyst means mounted in a housing wherein a straight or substantially straight air tube with a closed end extends into the housing for injecting air into the exhaust gases for oxidation thereof: the improvement comprising in combination, three circumferentially-spaced rows of holes in the air tube, the holes in one of said rows facing upstream into the exhaust gases, the holes in the other tow rows facing in diametrically opposite directions at right angles to the exhaust gas flow, the holes in each of said rows being linearly arranged and equally spaced along the length of tube and decreasing in size toward the closed end either progressively or in groupings of equal hole size so as to deliver substantially equal amounts of air, and the holes in all said three rows being sized in relation to each other so that the one row of upstream facing holes delivers 10–20% of the total air while the other two rows of holes deliver substantially equal amounts of air and cooperatively the remaining 80–90%.

* * * * *

UNITED STATES PATENT AND TRADEMARK OFFICE
CERTIFICATE OF CORRECTION

PATENT NO. : 4,238,456
DATED : December 9, 1980
INVENTOR(S) : John I. Jalbing

It is certified that error appears in the above—identified patent and that said Letters Patent is hereby corrected as shown below:

Column 7, line 26, "30,125" should read -- 30,088, now U.S. Patent No. 4,256,700 --.

Signed and Sealed this

Eighth Day of June 1982

[SEAL]

Attest:

Attesting Officer

GERALD J. MOSSINGHOFF
Commissioner of Patents and Trademarks